United States Patent [19]
Thompson et al.

[11] 3,944,846
[45] Mar. 16, 1976

[54] SUBSYNCHRONOUS RELAY

[75] Inventors: Maxwell A. Thompson, Alhambra; Tak S. Ning, Los Angeles, both of Calif.

[73] Assignee: Southern California Edison Company, Rosemead, Calif.

[22] Filed: Mar. 19, 1974

[21] Appl. No.: 452,662

[52] U.S. Cl. ............................... 307/129; 317/138
[51] Int. Cl.² ........................................ H01H 83/00
[58] Field of Search .................... 335/2; 322/32, 58; 340/253 Y, 248 A; 307/125–129; 317/53, 138, 147

[56] References Cited
UNITED STATES PATENTS
3,144,590   8/1964   Sharp et al. ........................... 317/138

OTHER PUBLICATIONS

G.E. Publication GET–7280, Switchgear Protective Relays, 9/70, pages all.

*Primary Examiner*—Robert K. Schaefer
*Assistant Examiner*—John W. Redman
*Attorney, Agent, or Firm*—Lyon & Lyon

[57] ABSTRACT

A relay for detecting sustained subsynchronous current on a power system. The relay includes a filter network for separating subsynchronous current from synchronous current and a detector network for measuring the detected subsynchronous current.

10 Claims, 1 Drawing Figure

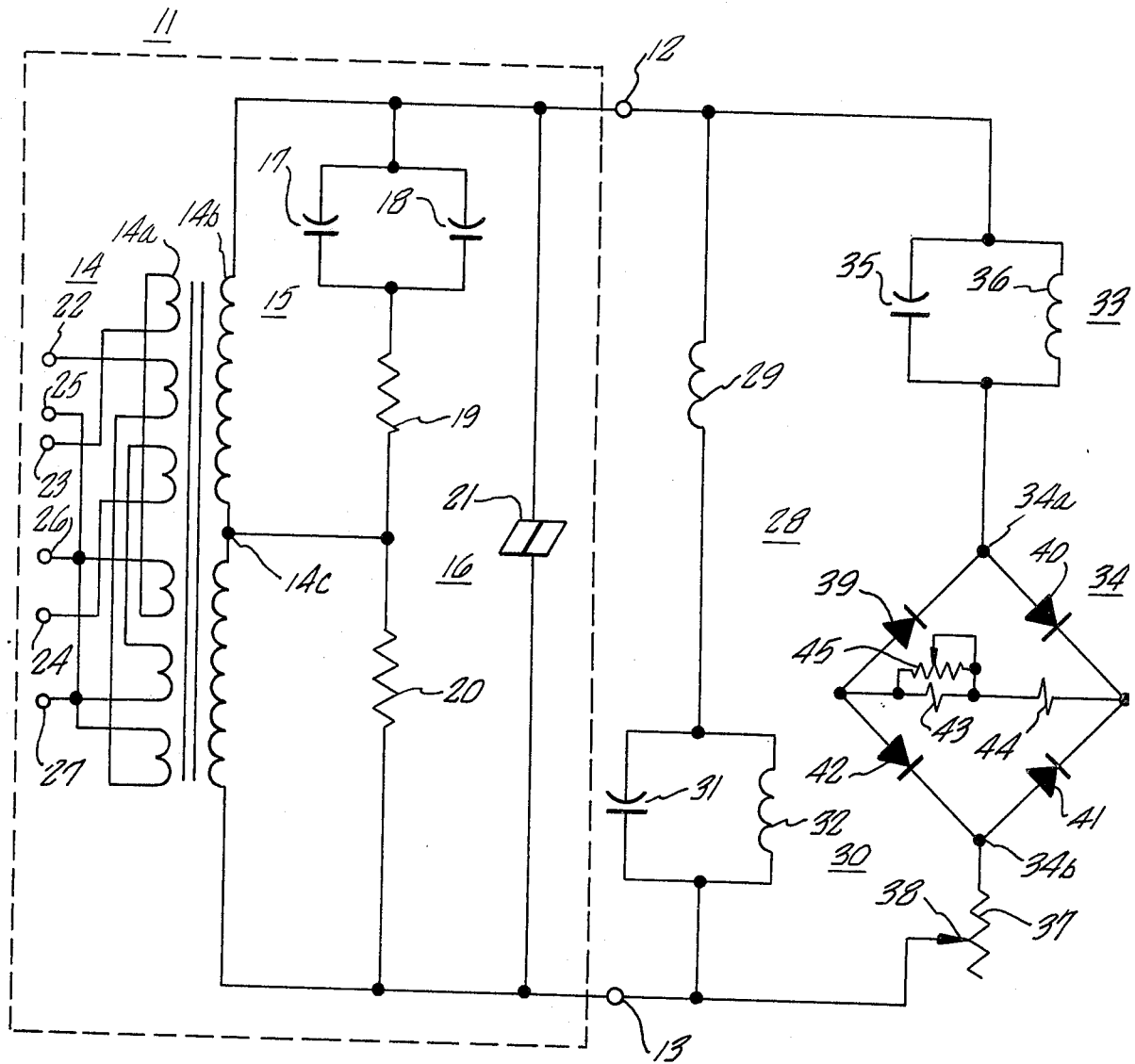

SUBSYNCHRONOUS RELAY

BACKGROUND OF THE INVENTION

This invention relates to subsynchronous overcurrent relays. More particularly, this invention relates to relays for detecting and measuring sustained subsynchronous current in electrical power equipment such as in generator unit windings and the like.

It is known that subsynchronous oscillations resulting in subsynchronous current occur on a series compensated power system as a result of the interaction of the series inductive and capacitive components of the system. More specifically, the dynamic interaction of a power system and its associated turbine generator is some instances result in the sustaining of the subsynchronous oscillations. These oscillations occur most noticeably during system transient as a result of system faults, or as a result of series capacitor switchings. In many instances, these ocillations are of a transient nature and are quickly damped. However, it has been determined that when subsynchronous oscillations occur for a sustained period, and if the subsynchronous oscillations are close to a natural shaft frequency of associated equipment such as a generator unit, the oscillations are amplified and generator damage may result.

In the past, the subsynchronous oscillations were neither detected nor measured and any associated generating unit was typically only protected from sustained subsynchronous oscillations when a failure, such as a generator field lead electrical failure at shaft bore entrance occurred. An actual failure may result not only in substantial repair costs, but also in a power failure during the shutdown period required to repair the damaged equipment.

Prior art relays, such as differential relays, which measure the difference between input and output signals, were found unsuitable for subsynchronous current applications since they were typically designed to provide protection from faults which result in a change in magnitude of the synchronous current, i.e. the current at the fundamental frequency. Differential relays with harmonic restraints were also found unsuitable since they were only concerned with restraining the relay from being operated by the harmonic frequency currents, i.e. multiples of the synchronous current, typically occuring during transitory conditions.

SUMMARY OF THE INVENTION

Briefly stated and according to an aspect of this invention, the problem of sustained subsynchronous current in a high voltage power system has been substantially overcome by providing the relay of this invention. The relay is a subsynchronous overcurrent relay installed in the secondary of a current transformer with the capability of detecting and separating the subsynchronous current from the syncrhonous current (e.g. 60 hertz). If the subsynchronous current is above a predetermined level, effective control action is initiated to prevent damage to the associated electrical equipment.

It is an object of this invention to provide a subsynchronous current relay for preventing damage to associated electrical equipment.

It is another object of this invention to provide a subsynchronous current relay which can detect subsynchronous current greater than a predetermined percentage of an associated generator unit rating, with or without the presence of synchronous current.

It is a further object of this invention to provide a compatible subsynchronous current relay which will protect associated electrical equipment without unnecessarily de-energizing the equipment.

BRIEF DESCRIPTION OF THE DRAWING

The invention, both as to its organization and principles of operation, together with further objects and advantages thereof, may better be understood by referring to the following detailed description of an embodiment of the invention taken in conjunction with the accompanying schematic representation of a subsynchronous relay system in accordance with this invention.

DETAILED DESCRIPTION

Referring now to the drawing, a unit 11 connected to perform a negative sequence overcurrent function is illustrated as being electrically connected to upper terminal 12 and lower terminal 13. Included within the unit 11 is a dual core current transformer having a multi-tapped three phase primary winding 14a and a center tapped secondary winding 14b all hereinafter referred to as transactor 14. Electrically connected to the secondary winding 14b of the transactor 14 is a phase shifting network 15 and a balancing network 16. The phase shifting network 15 includes a pair of parallel connected capacitors 17 and 18. The balancing network 16 includes balancing resistors 19 and 20. Either or both of the balancing resistors 19 and 20 may be adjustable. Connected across the output of the transactor 14 and between the terminals 12 and 13 is a thyristor 21. The thyristor 21, as is well known, provides a protective voltage limiting function.

In operation, the transactor 14, which may be of the type manufactured by General Electric Company designated as Type INC, receives a current input from each of three phases at current input terminals 22, 23 and 24. Terminals 25, 26 and 27 are connected in common as neutral points.

The transactor 14 with the phase shifting network 15 and the balancing network 16 connected at its secondary will perform as a negative current sequence detector. That is, when each phase at terminals 22, 23 and 24 is in balance, i.e. the magnitude and angle of each being equal, equal and opposite voltages will develop between the center tap 14c of the secondary winding 14b and terminal 12, and between the center tap 14c and terminal 13. Thus, in balance, no output between terminals 12 and 13 is realized as to the synchronous current, e.g. 60 hertz. When an unbalance occurs, the voltage between terminals 12 and 13 is proportional to the negative sequence input current. The balancing function of the transactor 14, phase shifting network 15 and balancing network 16 is well known in the art.

It has been observed that balancing circuitry such as included in unit 11 which may provide a negative sequence balancing function will produce an output signal at terminals 12 and 13 whenever the input synchronous current is out of balance or whenever currents at frequencies other than the fundamental frequency are present.

The observation of the output signals of negative sequence current balancing circuitry has been determined to be most useful in practicing the instant invention. Since terminals 12 and 13 will provide an output from the unit 11 if any subsynchronous current exists, even if the subsynchronous current is balanced, and further since the balancing function of unit 11 is typically utilized in power system applications, the output of unit 11 at terminals 12 and 13 may readily be used as an input to the filter detector arrangement included in the instant invention.

An added advantage of utilizing the output of unit 11 as the source of subsynchronous current to be detected is that when the system is in balance and no subsynchronous current exists, there is no subsynchronous or synchronous output from unit 11, and thus no activation of any component to the right side of terminals 12 and 13.

Turning now to the remaining portion of the circuit, connected between the terminals 12 and 13 is a filter network 28. The filter network 28 includes an inductor 29 electrically connected between the terminal 12 and a parallel resonant network 30. The resonant network 30 includes a capacitor 31 and an inductor 32 connected in parallel. The resonant network 30 is in turn electrically connected to the terminal 13.

The filter network 28 is a dual tuned blockpass filter. Assuming that the subsynchronous current desired to be blocked falls into the 20 through 40 hertz range, then typical values for the components of the filter network 28 are 0.465 henrys for inductor 29, 1.22 henrys for inductor 32 and 20 microfarads for capacitor 31. Also assuming that the synchronous current has the typical fundamental frequency of 60 hertz, the filter network 28 will provide a pass to the synchronous current, i.e. 60 hertz. The resonant network 30 is designed to resonate at a preselected frequency, i.e. 30 hertz, thereby providing a blocking to the subsynchronous current (i.e. 20–40 hertz).

Connected in parallel to the filter network 28 is a synchronous block filter 33 which is electrically connected between the terminal 12 and the AC input side 34a of a full wave rectifier 34. The synchronous block filter 33 includes the parallel combination of capacitor 35 and inductor 36. Typical values (assuming a 60 hertz synchronous current) for the capacitor 35 is 5.75 microfarads and for the inductor 36, 1.22 henrys. Use of the filter 33 results in better sensitivity in the overall system in that it will be a block to the synchronous current. Although filter network 28 is a pass to the synchronous current, it necessarily must include some impedance and thus the need for filter 33 when increased sensitivity is desired.

Connected on one AC terminal 34b of the full wave rectifier 34 is a variable resistor 37 which may be adjusted in order to provide overall sensitivity, as is well known in the art. The resistor 37 is electrically connected through its associated wiper arm 38 to terminal 13.

Full wave rectifier 34 includes diodes 39 through 42 connected in a manner well known in the art to provide full wave rectification. Connected across the DC side of the rectifier 34 are series connected level detectors 43 and 44. As is known in the art, detectors, such as high set detector 43 and low set detector 44 each represent the coil parts of an associated relay which, when current is passed therethrough will cause the closing of an associated contact. Connected across detector 43 is a variable resistor 45, having a typical value such as 250 ohms, which determines the level of activation for the high set detector 43.

In operation, if any subsynchronous current occurs at the terminals 12 and 13, it will be provided at the AC terminals 34a and 34b of the full wave rectifier 34 and cause a corresponding DC current to appear at the DC side of the rectifier 34. The detectors 43 and 44 may be set any desired level. For example, the low set detector 44 may be set to have a minimum sensitivity of 5 percent of the generator rating such as 0.21 amp at 30.3 hertz. The high set detector 43 may be set to have a sensitivity of 20 to 50 percent of the generator rating such as 1.23 amps at 30.5 hertz.

Thus, if subsynchronous current present at the DC side of the rectifier 34 is less than 0.21 amp, neither high set detector 43 nor lower detector 44 is energized and no associated contacts are closed. When the current is between 0.21 and 1.23 amps, low set detector 44 will cause the closing of its associated contact. When the current presented to the detectors is greater than 1.23 amps, both detectors 43 and 44 will close their associated respective separate contacts.

Typically, since a premature shutdown of generating equipment in a power system is extremely costly, a suitable time delay is provided before the lower limit detector 44 causes the closing of its associated contact to allow for the natural damping of the transient subsynchronous oscillations. Likewise, when the subsynchronous level is at a value sufficient to also cause detector 43 to close its associated contact, the closing thereof is much more rapid because of the immediacy of the problem, i.e. a faster trip occurs due to the magnitude of the subsynchronous current. For example, when external fixed time delay auxiliary relays are used such as for providing the time delay necessary to allow system transients to be damped, the low set detector 44 is provided with a time delay of 2.0 seconds and the high set detector 43 is provided with a time delay of 0.33 second.

The circuit of the present invention can also be used to initiate other control actions to prevent damage to the associated generating unit in response to the detection and measuring of the subsynchronous current such as providing an alarm, switching in bypass capacitors, or utilizing well known damping techniques.

The level of the detectors 43 and 44 are preferably set to provide minimum relay response to low frequency operation under emergency system conditions (55–60 hertz) while still providing protection to associated equipment. Further, filters may be introduced to bypass any unwanted components such as unwanted harmonics produced by the transactor, if the same is determined to produce such an unwanted harmonic. For example, if the Type INC transactor described previously, a 300 hertz filter was introduced between terminals 12 and 13 to bypass unwanted fifth harmonic components.

A subsynchronous overcurrent protection relay has been provided which is compatible with existing equipment and which may safely be used with an associated generating unit in an overcurrent protection scheme. The relay of this invention provides its measuring function only if either subsynchronous current is detected or if an unbalance condition occurs thereby reducing the chance for an erroneous operation of the relay in a preferred embodiment.

Further, the associated delay scheme provides a further precaution against unwanted isolation of associated equipment in that natural damping of subsynchronous oscillations is permitted to take place if the same can be done so safely.

While an embodiment and application has been shown and described, it will be apparent to those skilled in the art that many more modifications are possible without departing from the inventive concepts herein described.

What is claimed as new and desired to be secured by Letters Patent of the United States:

1. A subsynchronous overcurrent relay system for providing protection for sustained subsynchronous current in a power system having a normal synchronous operating frequency and wherein said subsynchronous current is of a lower frequency,
   input circuit means for connection with said power system for receiving from said power system a subsynchronous current,
   first filter means connected across said input circuit means for passing synchronous current at said normal frequency and for blocking subsynchronous current, said filter network means comprising a block-pass filter for passing synchronous current and blocking said subsynchronous current, and
   second filter network means connected in series with detector means, the series combination of said second filter network means and said detector means being connected across said input circuit means and in parallel with said first filter circuit means for blocking the synchronous current and for passing a predetermined range of subsynchronous current and for detecting the predetermined range of subsynchronous current, said second filter network means comprising a filter network for passing said predetermined range of subsynchronous current and for blocking said synchronous current, and said detector means comprising a first high-set detector and a second low-set detector both connected in series and connected in series with said second filter network means for respectively operating when said subsynchronous current is within said predetermined range, said detectors having upper and lower response limits for the subsynchronous current for providing, after predetermined delays to allow for natural damping of the subsynchronous current, a change of state of an associated electrical contact means when the subsynchronous current is greater than the limits.

2. A system as in claim 1 wherein
said first filter circuit means comprises a parallel resonant network including an inductance connected in parallel with a capacitor, the parallel resonant network being connected in series with a series inductance, and the series combination of the parallel resonant network and the series inductance being connected across said input circuit means.

3. A system as in claim 1 wherein
said second filter network means comprises a synchronous blocking filter including an inductance connected in parallel with a capacitance.

4. A system as in claim 1 wherein
said detector means comprises a full wave bridge rectifier having alternating current input terminals connected in series with said second filter circuit means and having direct current output terminals connected to said detectors, wherein said rectifier rectifies said subsynchronous current and said detectors comprise relay windings for operating said electrical contact means.

5. A system as in claim 1 wherein
the frequency of said synchronous current is 60 hertz, and
the frequency of said subsynchronous current is within the range of 20 to 40 hertz.

6. A system as in claim 1 wherein
said block-pass filter has a resonance frequency of approximately 30 hertz.

7. A subsynchronous overcurrent relay system for providing protection from sustained subsynchronous current in a power system having a normal synchronous operating frequency and wherein said subsynchronous current is of a lower frequency,
   input circuit means for connection with said power system for receiving from said power system a subsynchronous current,
   first filter means connected across said input circuit means for passing synchronous current at said normal frequency and for blocking subsynchronous current, said filter network means comprising a dual tuned block-pass filter for passing synchronous current and blocking said subsynchronous current and including a parallel resonant network having an inductance connected in parallel with a capacitor, the parallel resonant network being connected in series with a series inductance, and the series combination of the parallel resonant network and the series inductance being connected across said input circuit means, and
   second filter network means connected in series with detector means, the series combination of said second filter network means and said detector means being connected across said input circuit means and in parallel with said first filter circuit means for blocking the synchronous current and for passing a predetermined range of subsynchronous current and for detecting the predetermined range of subsynchronous current, said second filter network means comprising a synchronous blocking filter network including an inductance connected in parallel with a capacitance for passing said predetermined range of subsynchronous current and for blocking said synchronous current, and said detector means comprising a first high-set detector and a second low-set detector both connected in series and connected in series with said second filter network means for respectively operating when said subsynchronous current is within said predetermined range, said detectors having upper and lower response limits for the subsynchronous current for providing, after predetermined delays to allow for natural damping of the subsynchronous current, a change of state of an associated electrical contact means when the subsynchronous current is greater than the limits.

8. A system as in claim 7 wherein
said detector means comprises a full wave bridge rectifier having alternating current input terminals connected in series with said second filter circuit means and having direct current output terminals connected to said detectors, wherein said rectifier rectifies said subsynchronous current and said detectors comprise relay windings for operating said electrical contact means.

9. A system as in claim 7 wherein the frequency of said synchronous current is 60 hertz, the frequency of said subsynchronous current is within the range of 20 to 40 hertz, and said dual tuned block-pass filter has a resonance frequency of approximately 30 hertz.

10. A subsynchronous overcurrent relay system for providing protection from sustained subsynchronous current in a power system having a normal sixty hertz synchronous operating frequency and wherein said subsynchronous current is of a lower frequency, input circuit means for connection with said power system for receiving from said power system a subsynchronous current, first filter means connected across said input circuit means for passing synchronous current at said normal frequency and for blocking synchronous current, said filter network means comprising a block-pass filter with a resonance frequency of approximately thirty hertz for passing synchronous current and blocking said subsynchronous current, said block-pass filter comprising a parallel resonant network including an inductor connected in parallel with a capacitor, the parallel resonant network being connected in series with a series inductor, and the series combination of the parallel resonant network and the series inductor being connected across said input circuit means, and second filter network means connected in series with detector means, the series combination of said second filter network means and said detector means being connected across said input circuit means and in parallel with said first filter circuit means for blocking the synchronous current and for passing a predetermined range of subsynchronous current and for detecting the predetermined range of subsynchronous current, said second filter network means comprising a synchronous blocking filter including an inductor connected in parallel with a capacitor, for passing said predetermined range of subsynchronous current and for blocking said synchronous current, and said detector means comprising a full wave bridge rectifier having alternating current input terminals connected in series with said blocking filter and having direct current output terminals connected to a first high-set detector in series with a second low-set detector for respectively operating when said subsynchronous current is within said predetermined range, said detectors having upper and lower response limits for the subsynchronous current for providing, after predetermined delays to allow for natural damping of the subsynchronous current, a change of state of and associated electrical contact means when the subsynchronous current is greater than the limits, said detectors comprising relay windings for operating said electrical contact means.

* * * * *